Feb. 15, 1966        A. J. KLOSE        3,234,966

BUTTERFLY VALVE DEVICE HAVING VELOCITY CONTROL MEANS

Filed Dec. 17, 1962        2 Sheets-Sheet 1

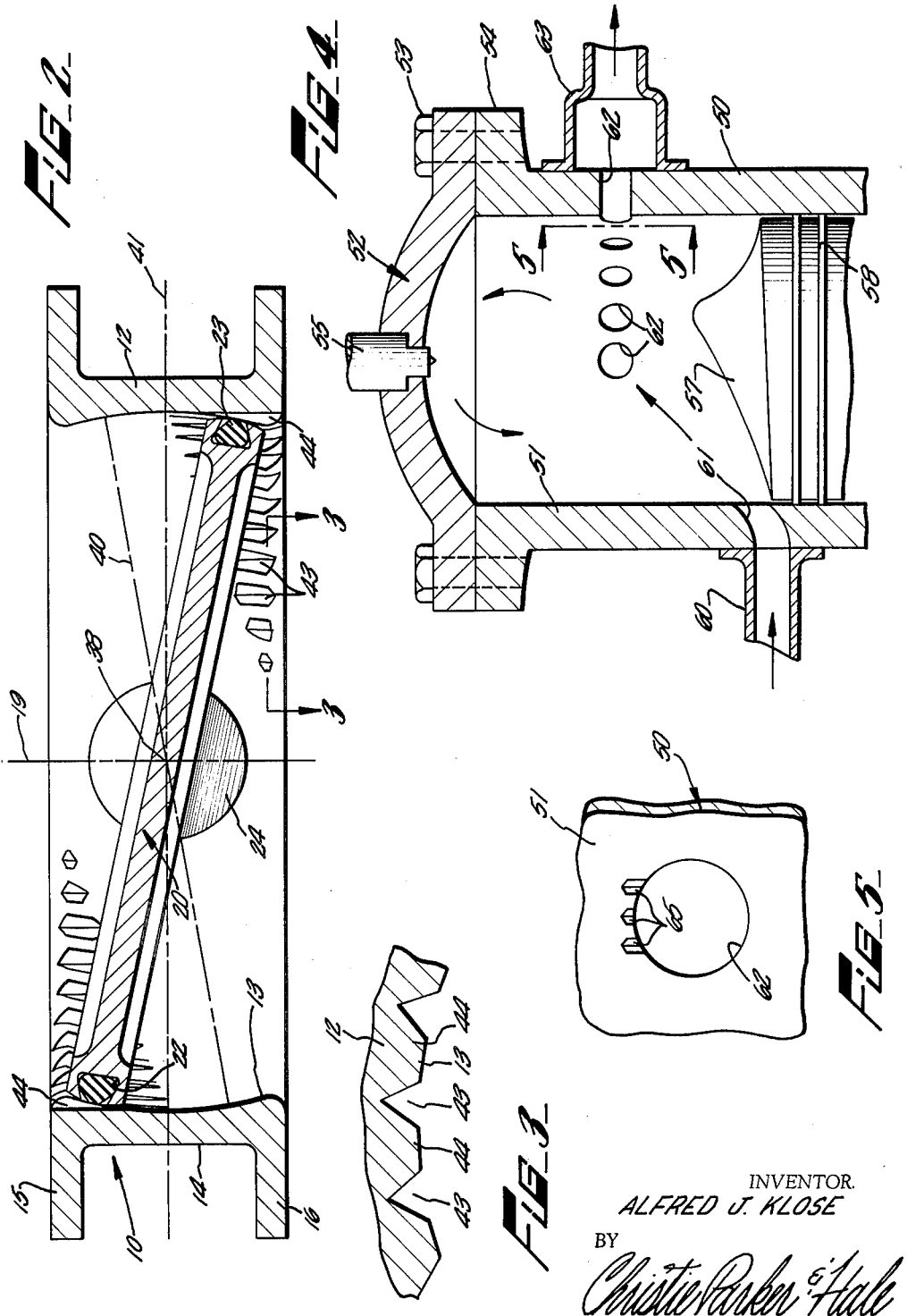

United States Patent Office 3,234,966
Patented Feb. 15, 1966

3,234,966
BUTTERFLY VALVE DEVICE HAVING VELOCITY CONTROL MEANS
Alfred J. Klose, Pasadena, Calif., assignor to Wallace O. Leonard, Inc., Pasadena, Calif., a corporation of California
Filed Dec. 17, 1962, Ser. No. 245,089
1 Claim. (Cl. 137—625.3)

This invention relates to fluid flow control, and, more particularly, to means for improving performance and reducing erosion and wear of sealing members in relatively high-pressure systems.

In many systems involving flow of gases or liquids at relatively high pressures, closure means are utilized in which the sealing means is a sealing ring peripherally adapted to a movable member to provide sealing engagement between the movable member and a stationary member. Examples include O-rings mounted on the periphery of butterfly valves and sealing rings mounted on pistons reciprocally movable in cylinders. Where a high-pressure differential exists across a sealing ring mounted in this manner, serious operating problems are encountered immediately after sealing engagement is broken upon opening, or immediately prior to closure before sealing engagement is established. At these points, the high-pressure differential produces flow of fluid through the constricted openings at high velocities. The consequences can be actual extrusion of the sealing ring from its mounting and, at the least, erosion and excessive wear of the sealing ring.

The present invention provides a structure for fluid flow control in which means are provided for handling the fluid flow at the points immediately after opening and immediately prior to closure in a manner such that the above-described problems are alleviated. The present invention is a fluid flow control apparatus including a housing having an interior surface defining a passageway. Movable means are disposed in the passageway for separating the passageway into a first chamber and a second chamber. Sealing means are adapted to the movable means for peripheral sealing engagement with the interior surface to provide a closure position between the first chamber and the second chamber. At least one passageway is formed in the interior surface to extend from a point adjacent the closure position of the sealing means to a point removed therefrom. The passageway is constructed to enable flow between the first chamber and the second chamber when movement of the movable means places the sealing means in a position immediately removed from sealing engagement.

Flow of fluid occurs through the passageway in the apparatus according to the present invention at the critical point either immediately prior to or immediately subsequent to sealing engagement of the sealing means. In this manner, the velocity of the fluid flowing through the constricted opening between the sealing means and the interior surface is diminished to the extent necessary to prevent extrusion or wear of the sealing means. In a presently preferred embodiment of the invention, a plurality of grooves, disposed as described above with respect to the passageway, are utilized.

The above-described features and advantages of the present invention will be more fully understood from the following detailed description and explanation, taken in conjunction with the accompanying drawings in which:

FIG. 2 is a sectional view taken along line 2—2 of FIG. 1;

FIG. 3 is an enlarged fragmentary cross-sectional view of a portion of the valve body generally taken along lines 3—3 of FIG. 2;

FIG. 4 is a cross-sectional elevation of a cylinder of a diesel engine in accordance with the present invention; and FIG. 5 is an enlarged fragmentary elevational view of an exhaust opening in the diesel cylinder taken along line 5—5 of FIG. 4.

Figure 1:
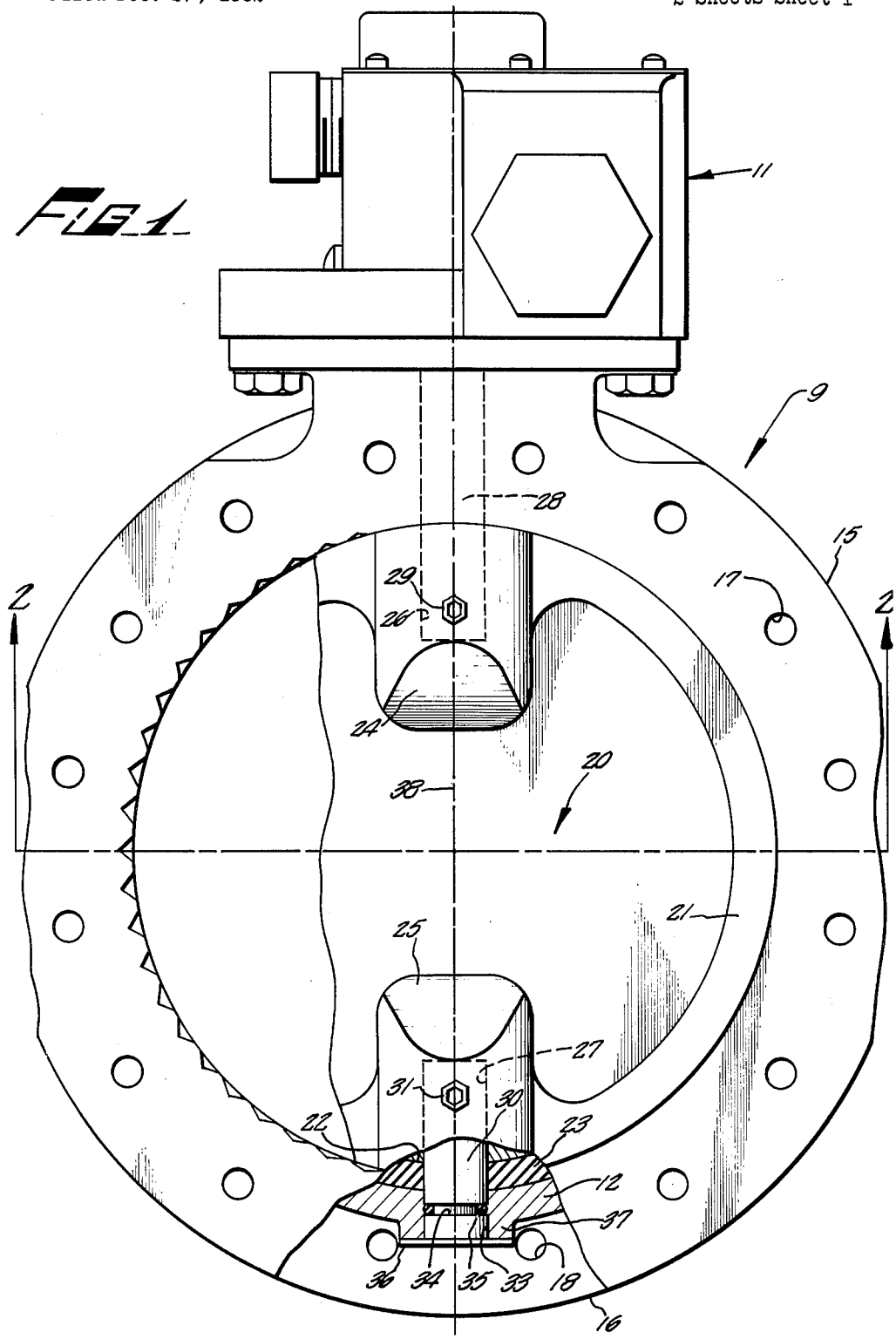
FIG. 1 is an elevational view, partially broken away, of a butterfly valve in accordance with the present invention.

With reference to FIGS. 1 and 2, an electrically operated butterfly valve 9 is illustrated. The valve has a body 10 with an electrically operated actuator 11 connected thereto. The electrically operated actuator does not form a part of this invention and therefore is not described in detail. Valve body 10 includes a cylindrical duct portion 12 having an inner surface 13 and an outer surface 14. At opposite ends of duct portion 12, radially extending peripheral flanges 15 and 16 are provided. The flanges include bolting holes of which holes 17 in flange 15 are shown in FIG. 1. The bolting holes are spaced at regular locations around the circular extent of flanges 15 and 16 and are provided for securing valve body 10 to flanged couplings of ducts to which the valve is connected. As identified in FIG. 2, duct portion 12 of the valve body has a longitudinal axis 19.

A circular valve member or disk 20 is pivotally mounted within valve body 10. The valve disk has a peripheral enlarged boss or bead 21 having a groove 22 formed in the bead. Groove 22 opens radially outwardly from the valve plate 20. As illustrated in FIG. 2, the groove has a restricted opening with the walls of the groove diverging radially inwardly of the plate toward the base of the groove. A resilient sealing O-ring or gasket member 23 is positioned within the groove 22 and is retained therein by virtue of the configuration of the groove.

A pair of enlarged pivot housing bosses 24 and 25 are provided in valve disk 20 in diametrically spaced apart locations. The pivot bosses have coaxial hollow portions or cavities 26 and 27, respectively, formed therein to open radially outwardly from the valve disk. Cavity 26 in boss 24 is adapted to receive a rotatable shaft 28 from actuator 11. The shaft is secured relative to the housing boss by an Allen-type set screw 29, athough it will be understood that the nature of the means for fixing disk 20 to shaft 28 is not material to the invention. A pivot axle 30 is journaled within cavity 27 of boss 25 and is secured therein by a second set screw 31. The pivot axle extends radially outwardly from the valve disk into engagement with a cooperating aperture 33 formed diametrically opposite actuator 11. The axle has a circumferential recess or annular groove 34 in that portion which lies within aperture 33 and in which a packing or sealing ring 35 is engaged to seal the axle relative to the aperture.

A cover or cap 36 is secured to the end of a valve body boss 37 depending from valve body 10. The cap may be threaded to boss 37 or, as illustrated in FIG. 1, it may be brazed or welded to the valve body to permanently secure axle 30 within the valve body in engagement with the valve disk. The valve disk is rotatable about an axis 38 which is coaxial with actuator shaft 28 and pivot axle 30. The valve member axis is oriented perpendicular to the axis 19 of valve duct portion 12.

Valve disk 20 is movable alternately between a first position and a second position. As represented in FIG. 2, the first position of the valve disk is transversely of valve body 10 in a position corresponding to a line 40 lying at an oblique angle (approximately 105°) to longitudinal axis 19 of duct portion 12 and constitutes a closed position. The second position of the valve disk is in alignment with the longitudinal axis 19 of the valve body and constitutes a fully opened position.

As further illustrated in FIG. 2, interior surface 13 of the valve body duct portion is curvilinear and conforms to the predetermined path of the periphery of the valve disk as it is rotated alternately between the first and second positions described above. O-ring 23 maintains a sliding engagement with the curvilinear portions of interior surface 13 of the valve body as the valve disk approaches the closed position shown by line 40 in FIG. 2, and is in sealing engagement with the interior surface in the closed position.

A plurality of longitudinally oriented passageways or grooves 43 are formed in interior surface 13 of the valve body and are defined between segments 44. Interior surface 13 constitutes the arcuate surface of segments 44. The grooves are spaced apart from each other at substantially equal intervals over a circumferential portion of the interior of valve body 10. As illustrated in FIG. 3, the grooves defined between segments 44 have a triangular cross-section; that is, the segments have inwardly converging planar walls.

In a presently preferred embodiment of the invention, two spaced apart groups of longitudinal grooves are provided. The two groups are disposed substantially diametrically opposite to each other with respect to longitudinal axis 19 of the valve body. The groups of grooves are disposed on opposite sides of the first or closed position of valve disk 20. Each group consists of a plurality of spaced apart grooves over a circumferential distance of a semi-circle. The grooves of each group progressively decrease in length, as particularly shown in FIG. 2, from the mid-point of the semi-circle so that the shortest length grooves of each group are adjacent pivot bosses 24 and 25 of the valve disk. The orientation and configuration of the grooves 43 is such that when valve disk 20 is in its first or closed position, O-ring 23 is in complete and entire sealing engagement with the arcuate ungrooved portions of interior surface 13 of the valve body. In this manner, duct portion 12 of the valve body is completely sealed to passage of a fluid through the valve.

Preferably, valve 9 is adapted for the regulation of a high-pressure fluid. The fluid may be a liquid or a gas and may flow in either direction through the valve body parallel to longitudinal axis 19. As the valve disk is rotated from its closed position 40 toward a fully opened position in alignment with longitudinal axis 19, O-ring 23 engages the surfaces of segments 44 immediately after sealing engagement is broken. The position of the valve disk in FIG. 2 corresponds to the minimum "open" setting of the valve. In this position, the high-pressure differential would, in a conventional valve of the type shown, cause the O-ring to be extruded from retaining groove 22. However, grooves 43 permit flow of fluid in a quantity sufficient to avoid unseating of the O-ring from its retaining groove. Furthermore, no oscillations of the O-ring relative to the retaining groove occur under a condition of reduced pressure differential so that wear of the sealing O-ring is minimized.

Preferably, the cross-section of the grooves 43 is triangular, as illustrated in FIG. 3. Such a cross-section insures that expansion of the O-ring into grooves 43 is not sufficient to block flow through the grooves. It will be understood that the effect herein described with respect to opening of valve 9 is also obtained as valve 9 is closed by rotation from the position defined by line 19 to the position defined by line 40 in FIG. 2.

FIGS. 4 and 5 illustrate another embodiment of the fluid flow central apparatus according to this invention. In FIG. 4, a cylinder of a diesel engine is illustrated. The engine has a cylinder 50 having an inner surface 51 and a cylinder head assembly 52. The cylinder head is secured by bolts 53 to a peripheral flange 54 formed on the exterior of the cylinder at its upper end. A fuel injector 55 is secured in the cylinder and a reciprocating piston 57, having a plurality of piston rings 58 mounted circumferentially thereon, is positioned within the cylinder. The diesel engine illustrated is of the loop-scavenge type and includes an inlet air manifold 60 secured to cylinder 50. An inlet air duct or aperture 61 is formed in the cylinder adjacent the "bottom dead-center" position of the piston. The inlet duct is angled upwardly within the cylinder such that incoming air is blown upwardly across the combustion chamber in the pattern represented by the arrows of FIG. 4. The scavenging air is exhausted from the combustion chamber through a plurality of exhaust apertures 62 formed over a portion of the circumference of the inner surfaces of the cylinder at a location intermediate the "bottom dead-center" position of piston 57 and its "top dead-center" position. An exhaust manifold 63 is secured to the exterior of cylinder 50, apertures 62 providing flow communication between the interior of the cylinder 50 and the exhaust manifold.

As illustrated in FIG. 5, a plurality of grooves 65 are formed in interior surface 51 of cylinder 50 adjacent the upper limits of the exhaust apertures. The grooves are oriented parallel to the direction of movement of the piston and extend into communication with the apertures. Reciprocation of the piston past apertures 62 opens and closes these apertures.

The normal functioning of a scavenging diesel engine is for fresh inlet air to be supplied to the cylinder through aperture 61 when this aperture is uncovered by downward movement of the piston past it. This fresh air is blown into the chamber and forces the products of combustion from the previous stroke of the piston outwardly through apertures 62 into exhaust manifold 63.

As piston 57 moves upwardly from its "bottom dead-center" position, it closes the inlet aperture and forces a portion of the remainder of the products of combustion and a portion of the fresh air charge outwardly of the cylinder through the exhaust apertures. Continued upward movement of the piston within the cylinder closes the exhaust apertures. Thereupon, continued upward movement of the piston compresses the air charge in the cylinder according to conventional diesel principles. At a few degrees above "top dead-center," the air in the cylinder is compressed to a point such that, when fuel is injected into the combustion chamber through injector 55 spontaneous combustion occurs and the piston is forced downwardly.

The high-pressure hot gases in the combustion chamber are exhausted through the exhaust apertures as the piston moves downwardly. The fluid flow control of the present invention becomes effective because of the high pressure differential imposed across piston rings 58 as the rings reach the upper limits of the exhaust apertures. Initial flow of the products of combustion out through apertures 62 is by way of grooves 65. Such flow prevents erosion of the exhaust apertures and of the piston rings as would otherwise occur, in accordance with principles already described, in the absence of the grooves. The high velocity of flow which would occur as the uppermost piston ring first uncovers a portion of the exhaust apertures, and the consequent deleterious effects, are avoided by flow of a portion of the gases through the grooves.

From the foregoing discussion and description of this invention, it is seen that the improvement in fluid flow control provided by this invention is compatible with various slidable sealing means used to seal a duct from flow of a high-pressure fluid through the duct. The resilient circular sealing means may be an O-ring, such as O-ring 23 illustrated in FIG. 1, or it may be a piston ring, such as piston ring 58 illustrated in FIG. 4.

While the invention has been described above in conjunction with specific apparatus, this has been by way of illustration and example only and should not be considered as limiting the scope of this invention.

I claim:

In a butterfly valve comprising a housing having an internal surface defining a fluid-flow duct through the housing, the duct having a longitudinal axis and a preselected transverse cross-sectional configuration, a valve disk disposed in the duct and having a peripheral configuration substantially conforming to the transverse cross-sectional configuration of the duct, means connected between the valve disk and the housing for mounting the disk for rotation in the duct about an axis traversing the duct so that the disk is movable between a first position in which the valve is open for flow of fluid therethrough and a second position in which the disk is disposed transversely of the duct and the periphery of the disk lies closely adjacent to the interior surface of the housing circumferentially of the duct so as to divide the duct into an upstream chamber and a downstream chamber, resilient sealing means carried by the valve disk substantially peripherally thereof and engageable with the housing internal surface when the disk is disposed in its second position for effecting a fluid-tight seal between the upstream and downstream chambers, the improvement comprising a curvilinear portion defined by the housing internal surface substantially circumferentially of the duct adjacent the location the sealing means occupies when the disk is in its second position, the housing internal surface along the curvilinear portion conforming to the path along which the sealing means moves immediately upon movement of the disk from its second position toward its first position, a plurality of spaced segments defined in the curvilinear portion substantially circumferentially of the duct, each segment commencing just adjacent the location the sealing means occupies when the disk is in its second position, the segments being spaced apart to define a plurality of grooves in the curvilinear portion lengthwise of the duct, each segment extending lengthwise of the duct a distance directly proportional to the distance said segment is spaced from the axis about which the disk is rotatable, the sealing means engaging said segments and fluid flow from the upstream chamber to the downstream chamber occurring through said grooves when the disk is disposed in a position immediately removed from its second position.

References Cited by the Examiner
UNITED STATES PATENTS

| | | | |
|---|---|---|---|
| 2,547,116 | 4/1951 | Gould | 251—309 |
| 2,688,975 | 9/1954 | Born. | |
| 2,882,010 | 4/1959 | Bryant | 251—306 |
| 2,883,149 | 4/1959 | Fiorentini | 251—306 |

FOREIGN PATENTS 620,055    5/1961    Canada.

ISADOR WEIL, *Primary Examiner.*